(12) United States Patent
Kaiba et al.

(10) Patent No.: US 8,801,131 B2
(45) Date of Patent: Aug. 12, 2014

(54) PRINTING DEVICE

(71) Applicant: LAC Corporation, Tokyo (JP)

(72) Inventors: Tadashi Kaiba, Tokyo (JP); Shuusei Murai, Tokyo (JP); Koji Kobayashi, Tokyo (JP)

(73) Assignee: LAC Corporation, Tokyo (JP)

( * ) Notice: Subject to any disclaimer, the term of this patent is extended or adjusted under 35 U.S.C. 154(b) by 0 days.

(21) Appl. No.: 13/797,047

(22) Filed: Mar. 12, 2013

(65) Prior Publication Data

US 2013/0293607 A1 Nov. 7, 2013

(30) Foreign Application Priority Data

Mar. 12, 2012 (JP) .................................. 2012-054653

(51) Int. Cl.
*B41J 29/38* (2006.01)

(52) U.S. Cl.
USPC ..................................... 347/12; 347/2; 347/3

(58) Field of Classification Search
USPC ............................................... 347/2–4, 5, 12

IPC ...................................... B41J 27/02,11/44, 7/36
See application file for complete search history.

(56) References Cited

U.S. PATENT DOCUMENTS 6,386,667 B1 * 5/2002 Cariffe ............................ 347/12

* cited by examiner

*Primary Examiner* — Lam S Nguyen
(74) *Attorney, Agent, or Firm* — Wenderoth, Lind & Ponack, L.L.P.

(57) ABSTRACT

A printing device having a turntable for turning a mounted printing object so that its printed face is directed upward, a printing head having a plurality of nozzles for spouting inks and being able to move toward a center of rotation of the printing object from outside the rotation of the printed face, and a controller provided for controlling a moving speed of the printing head, a rotating speed of the turntable, and spouting of the inks by the plurality of nozzles, to perform a controlling operation in a manner such that a printing is spirally applied onto the printed face of the printing object by permitting the printing object mounted on the turntable to be rotated and by permitting the printing head to continuously move while allowing the plurality of the nozzles to spout therefrom the inks.

2 Claims, 5 Drawing Sheets

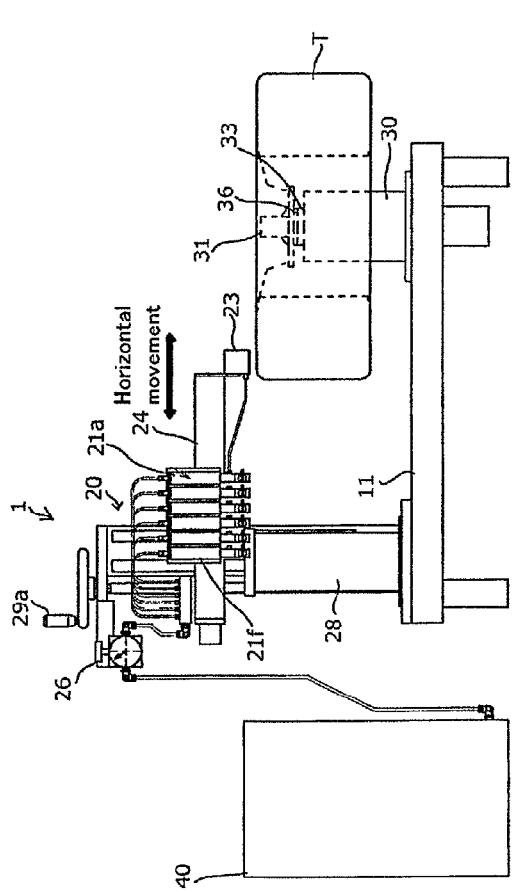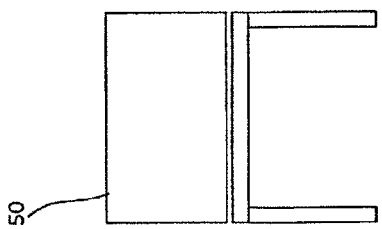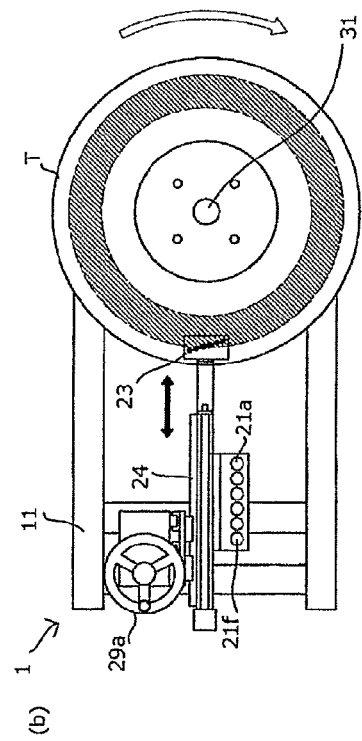
Fig. 1a
Fig. 1b

Fig 5 (Fig. 5a and Fig. 5b)
(a)
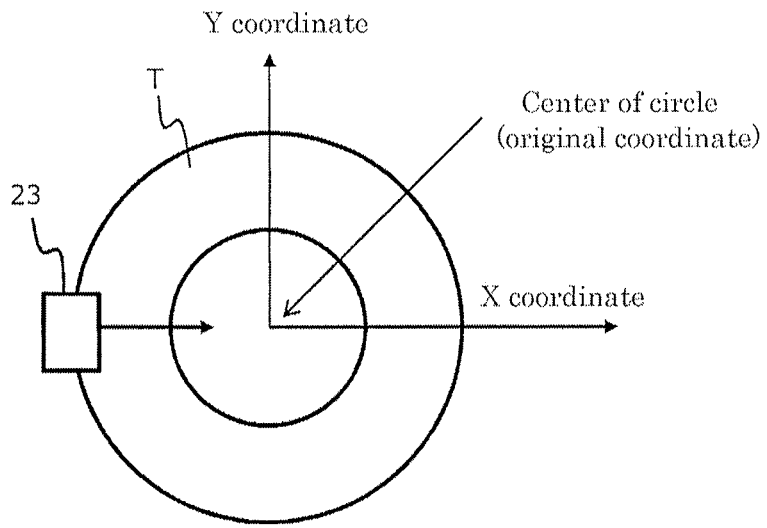
(b)
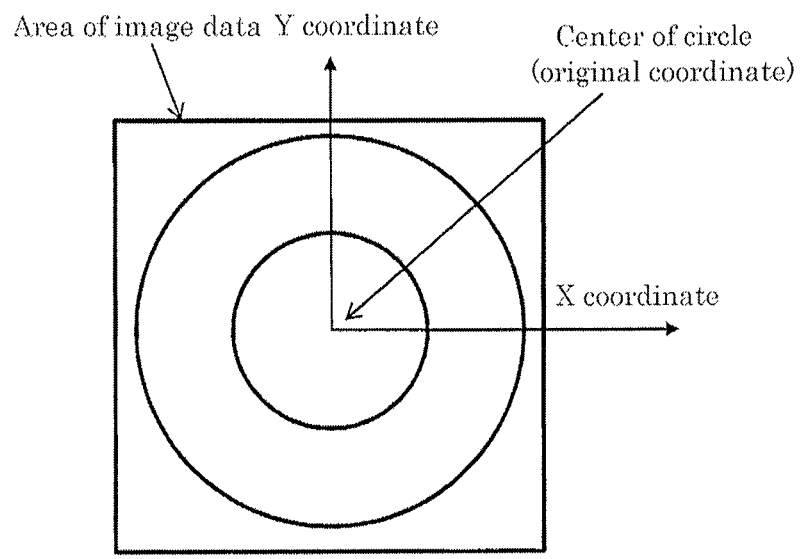

PRINTING DEVICE

BACKGROUND OF THE INVENTION

1. Field of the Invention

The present invention relates to a printing device and in particular, it relates to a printing device for printing desired designs and/or letters on a printed face of doughnut-like shape, such as a sidewall face of a vehicular tire.

2. Description of the Related Art

The color of many vehicular tires is generally black for the reason that carbon black is compounded into the rubber component of each tire to be used as a reinforcing agent. However, a demand for colorful vehicular tires in addition to the black one has arisen and some reinforcing agents without carbon black have been developed. As a result, it has become possible to produce tires with various kinds of colors. Nevertheless, there is no superior reinforcing agent to the carbon black in terms of manufacturing cost and functional property and this is a principal factor that the colored tires except for the black tires fail to spread.

Therefore, some methods and apparatus have been proposed to apply colorful colors to the black tires by printing rather than coloring the rubber of which the tire itself is made. For example, some methods of and apparatus for printing in full color on the sidewall face of a tire are disclosed in Japanese laid-open patent publication 2010-125,440 (it will hereinafter be referred to as JPA-'440). The apparatus of JPA-'440 is typically provided with an importing section, an inversion section, a printing section, an exporting section, a controlling section for controlling these elements and a print-controlling section to control the printing motion of the printing section. At the stage of the printing section, cleaning of the printed sidewall face of a tire and primer coating are made, and subsequently a printing is conducted by IJP (inkjet) printing equipment. Then, the injected ink is cured and fixed by exposure of UV ramp U at each printing operation. A predetermined print pattern is printed onto a predetermined position of a tire by recognizing the print-registration mark of the tire added beforehand by an identifying camera, by employing the values of predetermined numbers of pulses generated by a ring encoder during the rotation thereof as a starting point for beginning the printing, and by transmitting a print-start signal to cause spouting of ink from each IJP head.

However, because the inkjet printing apparatus described in JPA-'040 is based on the identifying camera for recognizing the print-registration mark and for creating the original signal, it might not be able to properly print when some dirt, dust and the like attach to the lens of the camera. There is also such a problem that the inkjet printing device is comprised of a lot of parts, resulting in suffering from being complicated in its controlling motion. Besides, there is a problem such that the apparatus tends to become large in its size because the apparatus has many sections such as the import section, the inversion section, the printing section and the exporting section, and these sections are mutually interconnected by the chain conveyer for conveyance.

Furthermore, upon printing, the sidewall of a tire is initially forcibly compressed by an upper weight roll for the purpose of surely flattening the compressed sidewall and thereafter, the printing operation is carried out so as to apply printing onto the flattened sidewall of the tire. Nevertheless, there is such a concern that some distortion of the printing might occur after the load applied by the upper weight roll was released and removed, and after the printed sidewall to which the printing was made under application of the compression thereto is recovered to an original state.

SUMMARY OF THE INVENTION

Therefore, an object of the present invention is to provide a printing device which is able to carry out a printing operation by which correct and beautiful designs and letters in full color onto a face having a doughnut-like shape such as the sidewall of a tire while the entire configuration of the device is simple and capable of improving the described defects encountered by the conventional printing device.

To achieve the above object, in accordance with one aspect of the present invention, there is provided a printing device that comprises:

a turntable configured to turn a printing object which is to be mounted on the turntable so that a printed face thereof is directed upward;

a printing head provided with a plurality of nozzles for spouting ink and configured to be able to move toward a center of rotation of the printing object from outside the rotation of the printed face of the printing object which is to be mounted on the turntable; and, a controller provided for controlling a moving speed of the printing head, a rotating speed of the turntable, and spouting of the ink by the plurality of the nozzles, the controller performing a controlling operation in a manner such that a printing is spirally applied onto the printed face of the printing object by permitting the printing object mounted on the turntable to be turned and by permitting the printing head to continuously move while allowing the plurality of the nozzles to spout the ink therefrom.

To further achieve the above-described object, in accordance with another aspect of the present invention, the printing device is further provided with such a configuration that the controller of the printing device is configured to control a printing operation in such a manner that pixel data of an image data intended to be printed on the printed face which pixel data is represented by an orthogonal coordinate is converted into a polar coordinate by means of a rotary determinant to thereby perform printing of the converted pixel data onto a predetermined location of the printed face.

In accordance with the printing device of the present invention, there is provided such an advantageous effect that since the printing ink can be continuously spouted to achieve the printing without stopping the movement of the printing head, the printing operation can be completed in a short period of time.

Also, an additional advantageous effect is provided in which in spite of a simple entire configuration of the printing device per se, printing of desired designs and letters in full color can be applied on the face having the doughnut-like shape, such as the sidewall of a tire.

BRIEF DESCRIPTION ON THE DRAWINGS

FIGS. 1a and 1b are side and top plan views illustrating an outline of the printing device according to an embodiment of the present invention;

FIGS. 5a and 5b are diagrammatic views illustrating and explaining the printing operation to apply printing onto a printing object during the rotation thereof.

DESCRIPTION OF A PREFERRED EMBODIMENT OF THE INVENTION

Figure 2:
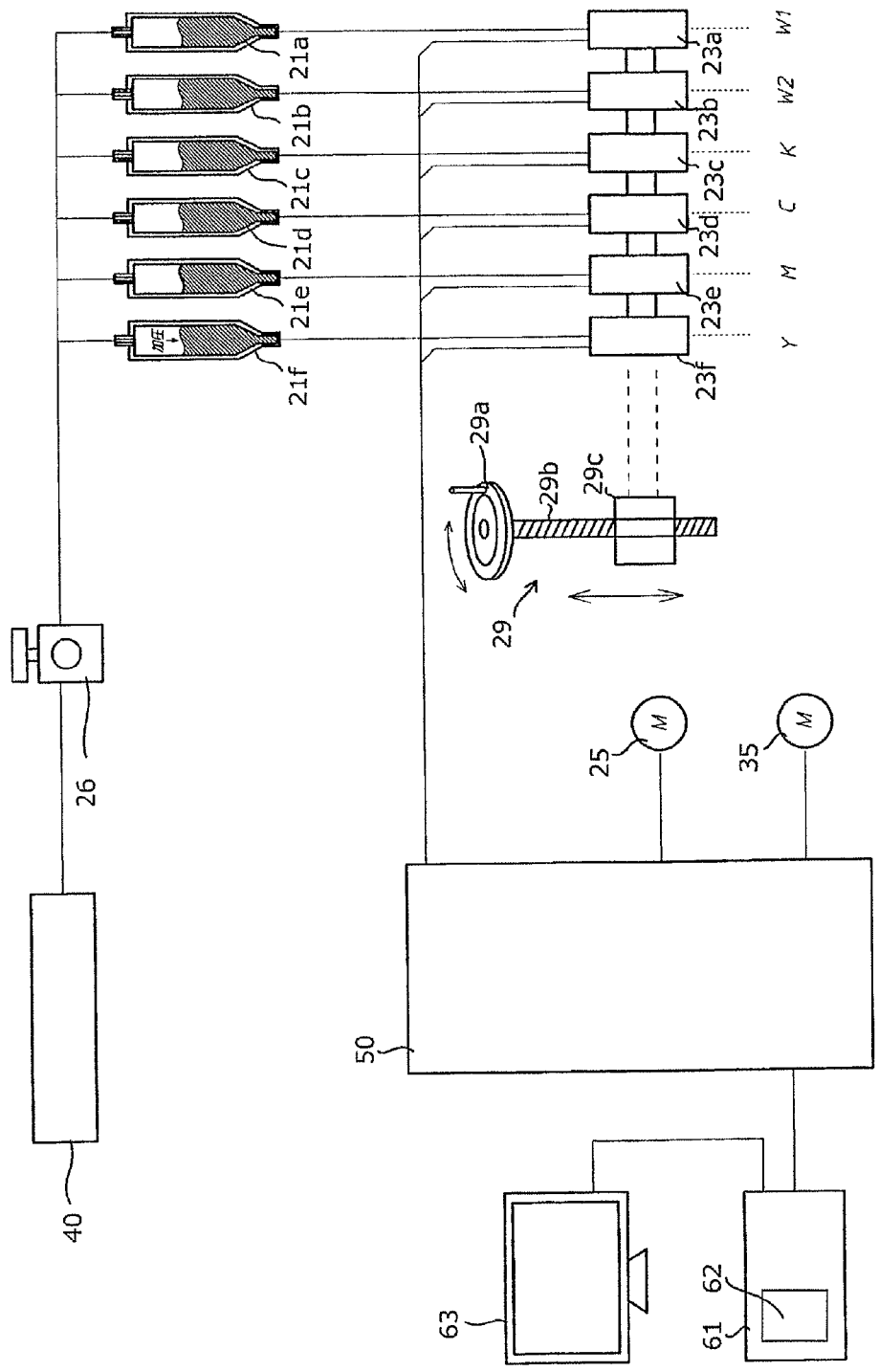
FIG. 2 is a schematic view illustrating the entire configuration of the printing device as shown in FIGS. 1a and 1b.

The detailed explanation of the printing device according to the present invention will be provided by referring to the drawings.

(The Configuration of a Preferred Embodiment of the Present Printing Device)

Referring first to FIGS. 1a and 1b, a printing device 1 is provided with a printing section 10 where a printing is made in full color on the printed side of a printing object, an air compressor 40 supplying pressurized air to later-described ink tanks 21a~21f of the printing section 10, and a controller 50 controlling the printing operation applied to a printing objective.

The printing section 10 includes a main printing body 20 which is comprised of various kinds of devices for implementing a printing and a table section 30 rotatably mounts thereon the printing object. The main printing body 20 and the table section 30 are disposed to be placed on a stand 11.

The main printing body 20 has six ink tanks, which contain therein color inks (paint) having different colors from one another, respectively, a printing head 23 in which nozzles 23a~23f are arranged at a predetermined disposition so as to be capable of spouting the ink supplied from respective of the ink tanks 21a-21f of different colors onto the printed face of the printing object, and a guide device 24 which disposes the printing head 23 at a position neighboring to the printed face of the print object mounted on the table section 30 and is able to move the printing head 23 towards a center of rotation of the printed face from the outside of the rotating printed face at the time of printing. Also, the main printing body 20 has an air regulator 26 capable of supplying the compressed air from the air compressor 40 to each of the ink tanks 21a~21f after adjusting the pressure of the compressed air, and a nozzle up and down mechanism 29 which is capable of adjusting a height between the printing head 23 moveably installed on the guide device 24 and the printed face of the printing object.

As described above, the ink tank 21 is configured to be provided with six ink tanks 21a~21f, in which the ink tank 21a contains therein a white ink (W1), the ink tank 21b contains therein another white ink (W2), the ink tank 21c contains therein a black ink (K), the ink tank 21d contains therein a magenta ink (M), the ink tank 21e contains therein a cyan ink (C), and the ink tank 21f contains therein a yellow ink (Y).

At this stage, it has been described that the white inks (W1 and W2) are filled in the ink tanks 21a and 21b, respectively. However, it is to be understood that it may be possible to adopt such an arrangement that the white ink (W) is accommodated only in the ink tank 21a, and the inks of the black (K), the cyan (C), the magenta (M) and the yellow (Y) are accommodated in the ink tank 21b~21e, respectively, and the ink tank 21f should be used as a spare ink tank.

It is to be further understood that the number of the ink tank 21a~21f is not limited to the described number, and it may alternately be possible to dispose any appropriate number of ink tanks as required. In addition, as for the ink of each color, eco-friendly aqueous ink may preferably be used.

It is to be understood that each of the ink tanks 21a~21f is connected to nozzles 23a~23f of respective spraying guns through suitable ink supply tubes, respectively.

Namely, the nozzle 23a is connected to the ink tank 21a (W1), the nozzle 23b is connected to the ink tank 21b (W2), the nozzle 23c is connected to the ink tank 21c (K), the nozzle 23d is connected to the ink tank 21d (C), the nozzle 23e is connected to the ink tank 21e (M), and the nozzle 23f (Y) is connected to the ink tank 21f.

Further, the illustrated nozzles 23a~23f of respective colors are provided so that one of them is prepared for each of the ink tanks 21a~21f, but instead, it may be possible to set up a plurality of nozzles 23a~23f, for example five nozzles for each of the ink tanks 21a~21f of respective colors.

The nozzle up and down movement mechanism 29 is disposed as a mechanism for adjusting the height position of the printing head 23. As illustrated in FIG. 2, the nozzle up and down movement mechanism 29 is comprised of a screw section 29b having screw threads, and a nut section 29c threadedly engaged with the screw section and being capable of moving up and down by the rotational motion of the screw section 29b. Further, a handle 29a for rotating the screw section 29b is placed at the uppermost end of the screw section 29b. And, the guide device 24 is attached to the nut section 29c. With this, it is possible to adjust the height of the printing head 23 which was attached to the guide device 24 by adjusting a vertical position of the guide device 24 due to the turning of the handle 29a. In addition, the screw section 29b is placed on a support base 28 to be vertically and rotatably installed on the stand 11.

The guide device 24 is comprised of a linear motion device with a non-illustrated running block which reciprocally linearly runs toward and away from on a linear rail, and the printing head 23 is attached to the running block. Besides, the running block is constructed so as to run on the linear rail by the drive of a drive motor 25 for driving a horizontal axis movement.

It should be understood that the drive motor 25 for a horizontal axis movement is designed and provided so as to move the non-illustrated running block when the motor 25 receives a control signal supplied from a later-described controller 50, thereby guiding the printing head 23 to a predetermined position of the printed side of the printing object. As a result, the printing head 23 is allowed to perform the printing operation against the printed side of the printing object.

It should here be noted that the guide device 24 is formed to be able to move back to an appropriate returning place by rotating the nut section 29b and the like so as to prevent from occurrence of any unfavorable situation where a later-described operation for loading a printing object onto the table section 30 is obstructed.

The table section 30 is provided and formed as a mount on which the printing object may be rotatably mounted. As a basic structure, the section 30 is comprised of a turn table 33 rotating with the printing object which is mounted thereon, a positioning guide 31 for determining the center of the rotation of the printing object mounted on the turn table 33, and a drive motor 35 for a rotating motion (refer to FIG. 2) for causing a rotation of the turn table 33 about the center that is determined by the positioning guide 31. In addition, an appropriate skid-prevention material 36 such as a plate-like rubber material is placed on the surface of the turn table 33 so that the printing object may surely rotate with the turn table 33 without slippage. It should be appreciated that in the described embodiment, a vehicular tire T is typically shown as a printing object. Namely, the opening of the tire T which is arranged in the central position of a vehicular wheel is inserted into the positioning guide 33 in the state that the vehicular wheel is attached to the tire T, and it is placed on the turn table 33 in such a way that the backside of the wheel is held by the turn table 33, so that the tire T can rotate thereon and so that the printed side of the tire T is directed upward. Thus, it is easily done to position the center of the tire T to the center of rotation of the turn table 33 through simply inserting the opening of the wheel with the tire T to the positioning guide 31. In addition, workability is remarkably enhanced in the work of mounting and dismounting the tire T because it is possible to cause a stable turning of the tire T by merely loading only the tire per se on the turn table 33 due to an arrangement of the skid-prevention material 36 such as a rubber-plate material that is provided on the turn table 33. Furthermore, the drive motor 35 for a rotating motion turns the tire T loaded and mounted on the turn table 33 when the motor 35 receives a control signal from the later-described controller 50.

Figure 4:
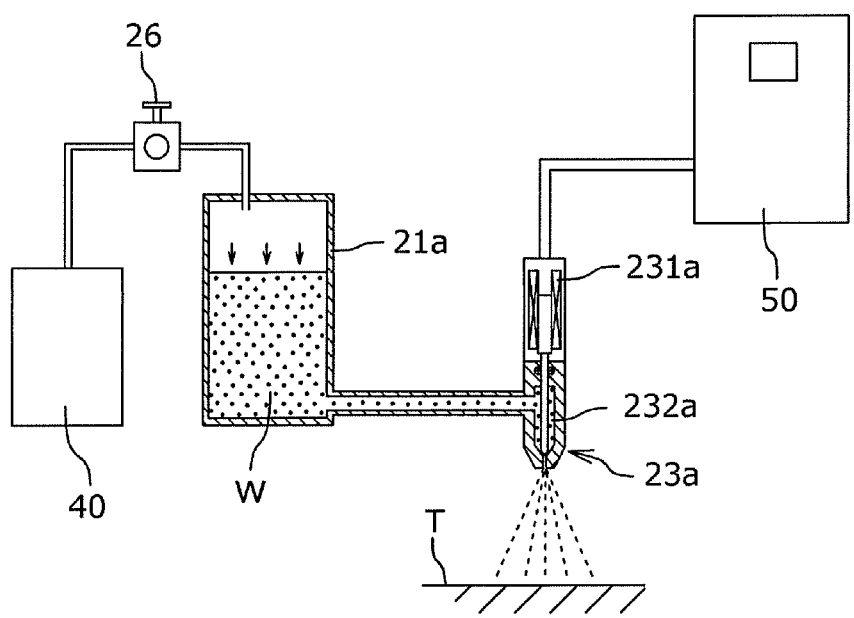
FIG. 4 is a schematic view, in part cross-section, illustrating the entire structure of the spouting mechanism of the ink spouting nozzle.

As shown in FIG. 4, the air compressor 40 can operate as a supply device for supplying a compressed air to each of the ink tanks 21a~21f filled with the inks of respective colors. The compressed air supplied from the air compressor 40 is supplied to each of the ink tanks 21a~21f after the pressure of the compressed air is adjusted to a predetermined pressure level by the air regulator 26, and the printing operation is performed by spouting the inks from respective nozzles 23a~23f under the pressure of the compressed air.

More specifically, as typically shown in FIG. 4, an electromagnetic actuator 231a and a needle valve 232b are disposed in the inside of the nozzle 23a so that the latter nozzle 23a opens and closes by the operation of the former electromagnetic actuator 231a, and the operation of the electromagnetic actuator 231a is controlled by a later-described nozzle drive controller 53a, which is provided in the inside of the controller 50. Thus, spouting of the ink (W) from the nozzle 23a is controlled, and a printing operation is applied onto the printed face (the sidewall) of the tire T. The ink spouting from the nozzle 23a is also controlled in terms of the color gradation depending on a change in the spouting amount of ink which is again controlled by the later-described controller 50.

Although FIG. 4 illustrates the case of the nozzle 23a, it should be noted that the other nozzles 23b~23f are configured to have a like structure, respectively.

At this stage, it should be noted that the nozzle 23a~23f of the printing head 23 are arranged in such a manner that the printing is firstly started with the white inks (W1 and W2). More specifically, as shown in FIG. 1b and FIG. 2, the nozzle 23a to print the white ink (W1) is located at the nearest to the positioning guide 31 in comparison with the remaining nozzles 23b~23f. In this way, after the white inks (W1 and W2) are initially printed by the employment of the nozzles 23a and 23b, the nozzle 23c located at a position adjacent to the nozzles 23a and 23b and provided for printing the black ink (K) is brought by the advancing movement of the printing head 23 to the position corresponding to the printed portion on which the white inks (W) were previously printed. The reason why the white inks (W1 and W2) are initially printed is to enable colors of the remaining inks to correctly come out, respectively. Therefore, as long as the white color (W1 and W2) is initially printed, the sequence of printing of the other or remaining colors is not limited to any particular one.

Figure 3:
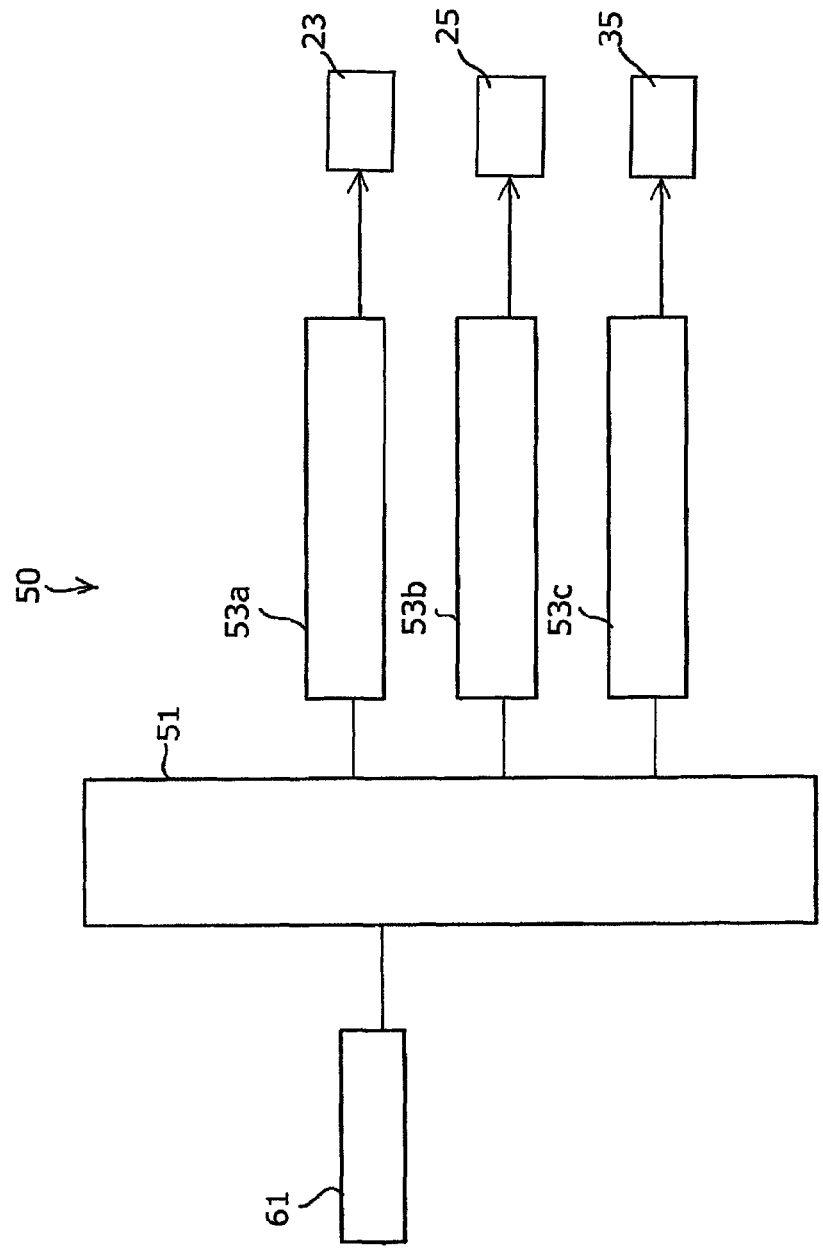
FIG. 3 is a block diagram illustrating the configuration of the controller.

Next, referring to FIG. 3, the controller 50 is provided with an arithmetic operation device 51 which is comprised of a non-illustrated central control unit (CPU) and a storage device such as a memory unit, and has a function to conduct a various types of operation so-called a computer function by processing the program recorded in the memory unit of the arithmetic operation device 51 by the CPU. As shown in FIG. 3, the controller 50 is provided with the nozzle drive controller 53a which controls the spouting of each ink from the nozzle 23a~23f, the horizontal axis drive motor controller 53b which controls the movement of the printing head 23 in a horizontal direction by controlling a rotation of the drive motor 25 for the horizontal axis movement, and the rotating axis drive motor controller 53c which controls the number of rotation of the printing object (the tire T) mounted on the turntable 33 by controlling the drive motor 35 for the rotating axis, and the above-mentioned controlling functions are exhibited according to execution of the program recorded in the memory unit non-illustrated in FIG. 3.

At this stage, since the described elements and units such as the CPU, the storage unit, e.g., the memory unit, and their specific structures have been well known in the art, a further detailed explanation is omitted here.

The controller 50 is also provided with an input section 61 (see FIGS. 2 and 3) which is arranged for conducting inputting operation to input settings of the movement of the printing section 10 and the table section 30, and the input section 61 per se is supplied with a touch panel 62 arranged in addition to the keyboard. Besides, the controller 50 also has a displaying section 63 (FIG. 2) to indicate the operating state of the printing device 1.

In addition, the data such as the patterns or the letters to be printed on the printed face or the sidewall of the tire T are read in by the controller 50 through an interface of the input section 61, and a printing operation is performed by controlling the movements of the nozzle drive controller 53a of the controller 50, the horizontal axis movement drive motor controller 53b and the rotation axis drive motor controller 53c based on the instructions that are inputted by means of the touch panel 62.

Now, the description of the printing control performed by the controller 50 will be provided hereinbelow. As shown FIG. 5a, the printing device 1 according to the present invention carries out an application of a printing to the printed face of the tire T in a spiral manner by continuously moving the printing head 23 from the side of the outer circumference in a direction toward the positioning guide 31 that are located at the center of rotation while allowing the tire T, i.e., a printing object to continuously rotate about the center. Further, the described spiral printing is carried out by controlling a rotating speed of the turn table 33, a moving speed of the printing head 23 and a spouting position and amount of each of the respective inks spouted from the nozzle 23a~23f while controlling mutual linking of the operations of the horizontal axis movement drive motor controller 53b, the rotation axis drive motor controller 53c and the nozzle drive controller 53a.

More specifically, as will be understood from the illustration of FIGS. 5a and 5b, the center of the circle of the rotating tire T is defined as the origin (0, 0) of the orthogonal coordinate (X-axis and Y-axis system). Further, the center position of an image data to be printed is defined as the center of the tire T. When a printing is carried out, a position of the nozzles 23a~23f is represented by a coordinate value from the center of the rotation according to such a specified interpretation that the tire T is fixedly mounted on the turn table 33 and the print head 23 is in the state of rotation.

The position at which inks should be spouted from the nozzles 23a~23f is called a dot position, and the sequential positions are succeedingly determined based on every constant angle of rotation or every constant distance. Then, a pixel value of an image data corresponding to each of the dot positions is defined as a data value that each dot position represents. The coordinates of the respective nozzles 23a~23f on the image data corresponding to the respective dot positions of the nozzles 23a~23f are obtained by converting the dot positions from the orthogonal coordinates system (the X-Y coordinate system) to the polar coordinate system by using the rotary determinant indicated by the formula as set forth below, based on the rotating angle of the tire T and the amount of movement of each of the nozzles 23a~23f.

$$R(\theta) = \begin{pmatrix} \cos\theta & -\sin\theta \\ \sin\theta & \cos\theta \end{pmatrix}$$

Next, sampling of the pixel data in the coordinate position of the image data that was obtained by the conversion due to the above-mentioned rotary determinant is conducted by the controller 50. At this time, the controller 50 either interpolates the image processing when the coordinate value is not an integer, or in terms the error that could not be expressed by one dot, it is appropriately corrected by using an error diffusion method for spreading into neighboring dots when the amount of the ink which is spouted from the nozzles 23a~23f is calculated from the density of the pixel data, and then a printing is implemented. A series of such movement in a printing is carried out by the nozzle drive controller 53a based on the program that is recorded in the storage device installed in the arithmetic operation unit 51 of the controller 50, the horizontal axis movement drive motor controller 53b and the rotating axis drive motor controller 53c. In this way, the printing is applied onto the printed face of the tire T.

The controlling of each part performed by the controller 50 at the time of printing is conducted by mutually inking the operations of the horizontal axis movement drive motor controller 53b, the rotation axis drive motor controller 53c and the nozzle drive controller 53a. To this end, for instance, a printing is performed by equalizing the relative moving speeds between the printing head 23 moving on a spiral truck and the tire T on the turn table 33 by making the rotation speed of the turn table 33 and the speed of the printing head 23 to become faster as they are approaching the center of rotation, it is done by making the movement speed of the print head keeping the number of rotation of the turn table 33. On the other hand, the controlling may be achieved by adjusting the amount of each ink that is spouted from the nozzles 23a~23f and by appropriately adjusting the spouting speed.

[Movement of the Printing Device]

Next, the description of the movement of the printing device 1 will be provided hereinbelow.

First, the image data of designs and letters to be printed on the printed face of the printing object is recorded and held in the arithmetic operation unit 51 of the controller 50 through the input section 61. Then, the printing object (the tire T) is loaded on the turn table 33 of the table section 30 while keeping the printed face to be upwardly directed.

At this time, the center of the tire T is placed on the center of rotation of the turn table 33 by the positioning guide 31 and is also held fixedly by the skid-prevention material 36 that is arranged on the surface of the turn table 33. Then, the printing head 23 is brought to a position fitting to the predetermined height position by operating the handle 29a. Subsequently, a printing operation is started by pushing non-illustrated operation button or buttons on the touch panel 62 of the controller 50.

When a printing start button on the touch panel 62 is pushed, the drive motor 25 for horizontal axis movement and the drive motor 35 for the rotating axis will start the operation, respectively, by the horizontal axis movement drive motor controller 53b and the rotation axis drive motor controller 53c to start the printing. In addition, the rotation speed of the turn table 33 is approximately set at 1~2 rounds/second, but can turn the table at an appropriate speed depending on a the designs and the letters to be printed.

When the printing head 23 is positioned at the printing start position for applying printing onto a printed face, white (W1) ink is firstly spouted from the nozzle 23a, and a printing is started. Because the turntable 33 is rotating while the printing head 23 is moving in the direction toward the rotating center, the printing of the white ink (W1) from the nozzle 23a to the printed face is conducted in a spiral manner. Then, when the nozzle 23b of the printing head 23 is subsequently located at the printing start position where the nozzle 23a previously spouted the white ink (W1), by the rotation of the turntable 33, a printing by the nozzle 23b is started and the white ink (W2) is printed. Following it, the nozzle 23a implements a printing of the white ink (W1) to a different new printing position of the printed face.

Furthermore, when the turntable 33 turns while printing head 23 moves to the direction of the rotating center, and the nozzle 23c is located at the printing start position of the nozzle 23a and the nozzle 23b, this time a printing from the nozzle 23c is started and the black ink (K) is printed in the position where the white (W1) and the white (W2) were previously printed. The printing head 23 carries out a printing on the printed face of the tire T in a spiral manner while repeating this movement in succession.

The printing by the printing head 23 is carried out by determining dot positions with regard to every constant angle of rotation or every constant distance where the respective inks are spouted, respectively, from each of the nozzles 23a~23f by the nozzle drive controller 53a of the controller 50 on the basis of the image data, and by defining a pixel value of the image data corresponding to the dot positions as the data value for expressing the respective dot positions, and based on the coordinate position that was converted by the aforementioned formula of the rotary determinant.

Then, the horizontal axis movement drive motor controller 53b and the rotation axis drive motor controller 53c of the controller 50 picture the designs and letters based on the image data that were recorded in the arithmetic operation unit 51 on the printed face by controlling the rotating speed of the printing head 23 and the turn table 33.

Furthermore, when a coordinate value is not an integer at the conversion by the afore-mentioned formula of the rotary determinant, or there is the error at the calculation of the amount of the ink to be spouted from the nozzle 23a~23f based on the density of the pixel data, an appropriate image processing is carried out by controlling the amount of the ink to be spouted from each of the nozzles 23a~23f by the nozzle drive controller 53a.

With the above movement, the printing device 1 prints the predetermined designs and letters on the printed face which is substantially the sidewall of the tire T i.e., the printing object.

Advantageous Effect of the Described Embodiment

As described above, the printing device with the present embodiment exhibits such an advantageous effect that a printing can be achieved in a short time because the printing device can continuously perform the printing operation while spouting the inks without stopping the movement of the printing head. In addition, there is another advantageous effect that it can print desired designs and letters in full color on a printed face having the doughnut-like shape such as the sidewall of a vehicular tire although the structure and the arrangement of the printing device are simpler in comparison with the conventional ones.

As mentioned above, the detailed description of the present invention was provided with respect to the preferred embodiment of the present invention, but it should be appreciated that the present invention is not limited to the specific embodiment that was described in details and various modifications and variations of the described embodiment will occur to a person having an ordinary skill in the art without departing from the spirit and scope of the present invention as claimed in the attached claims.

Thus, the printing object was described with the vehicular tire T as one typical example, but it is not limited thereto and it is able to print on the printing objects with ring-shaped, disc-shaped and the other appropriate shape.

Furthermore, it should be appreciated that the entire contents of Japanese Patent Application 2012-054653, on which the convention priority is claimed is incorporated herein by reference.

What is claimed is:

1. A printing device comprising:
    a turntable configured to turn a printing object which is to be mounted thereon in such a manner that a printed face thereof, which has a doughnut shape, is directed upward;
    a printing head provided with a plurality of nozzles for spouting inks and configured to move axially towards a center of rotation of the printing object from outside the doughnut-shaped printed face of the printing object; and
    a controller provided for controlling a moving speed of the printing head, a rotating speed of the turntable, and spouting of the inks by the plurality of the nozzles, the controller performing a controlling operation in a manner such that a printing is spirally applied onto the doughnut-shaped printed face of the printing object by continuously axially moving the printing head while spouting inks from the plurality of the nozzles, respectively, at a constant interval, and increasing the rotating speed of the turntable and the axial moving speed of the printing head as the printing head approaches the center of rotation so as to equalize a relative moving speed between the printing head and the printing object on the turn table.

2. The printing device as claimed in claim 1, wherein the controller is configured to control a printing operation in such a manner that pixel data of an image data intended to be printed on the doughnut-shaped printed face which pixel data is first represented by an orthogonal coordinate is converted into a polar coordinate by means of a rotary determinant to thereby perform printing of the converted pixel data onto a predetermined location of the doughnut-shaped printed face.

* * * * *